United States Patent [19]

Sumi

[11] 4,006,449
[45] Feb. 1, 1977

[54] INFORMATION DETECTOR FOR A TIRE WHEEL

[75] Inventor: Momoki Sumi, Tokyo, Japan

[73] Assignees: Momoki Sumi, Tokyo; Shunichi Hishikawa, Kobe, both of Japan

[22] Filed: July 8, 1975

[21] Appl. No.: 594,050

[30] Foreign Application Priority Data

July 12, 1974 Japan ............... 49-82455[U]

[52] U.S. Cl. .................. 340/58; 200/61.25
[51] Int. Cl.² .......................... B60C 23/02
[58] Field of Search ............ 340/58; 73/146.5; 180/103; 200/61.22, 61.25

[56] References Cited

UNITED STATES PATENTS

| | | | |
|---|---|---|---|
| 2,274,557 | 2/1942 | Morgan et al. | 340/58 X |
| 3,662,335 | 5/1972 | Fritze | 340/58 |
| 3,665,387 | 5/1972 | Enabnit | 340/58 |

Primary Examiner—Alvin H. Waring
Attorney, Agent, or Firm—Griffin, Branigan & Butler

[57] ABSTRACT

An information detector for a tire wheel includes a rotating coil extending about the circumference of the wheel, and two stationary coils inductively coupled to one another through the rotating coil. A parameter of the rotating coil is modified by tire pressure or the like to affect the coupling between the stationary coils. In one embodiment, the resistance of the rotating coil is modified and in another embodiment, the inductance of the rotating coils is modified.

12 Claims, 12 Drawing Figures

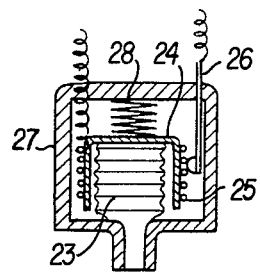
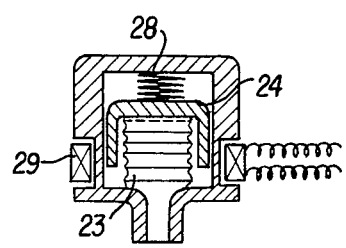
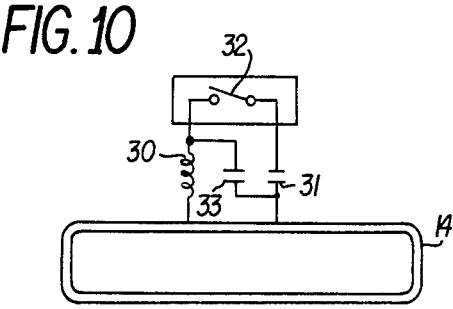
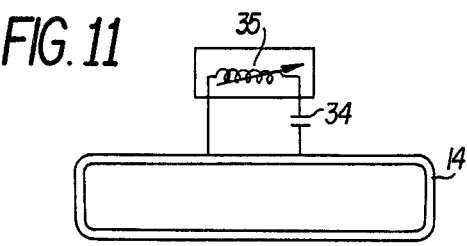
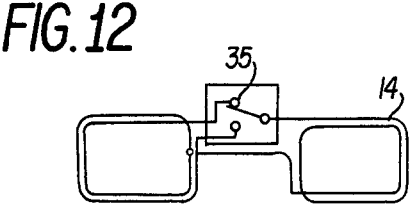

INFORMATION DETECTOR FOR A TIRE WHEEL

BACKGROUND OF THE INVENTION

This invention relates to an information detector for a tire wheel having a high signal-to-noise ratio and including a coil for rotation.

Recently, development of highways has been remarkable, and car speeds are increasing. Dangerous accidents, especially on motorways, are caused by the puncture or bursting of tires during driving. It is therefore desirable for drivers to detect the condition of air pressure in their tires both during driving and when stopped to prevent such accidents.

The major object of this invention is to provide an information detector for a tire wheel having coils for electromagnetic coupling which has an increased signal-to-noise ratio and which provides signals with high output amplitudes for correct detection.

BRIEF DESCRIPTION OF THE DRAWINGS

FIG. 8 is a sectional view showing a detection portion of a tire wheel according to this invention as being a variable resistance element;

FIG. 9 is a similar view to FIG. 8, but showing the detection portion as being a variable inductance element; and FIGS. 10–12 are respective schematic diagrams depicting various coils for rotation designed for detection of information in several phase variations.

DESCRIPTION OF THE PREFERRED EMBODIMENT

Figure 1:
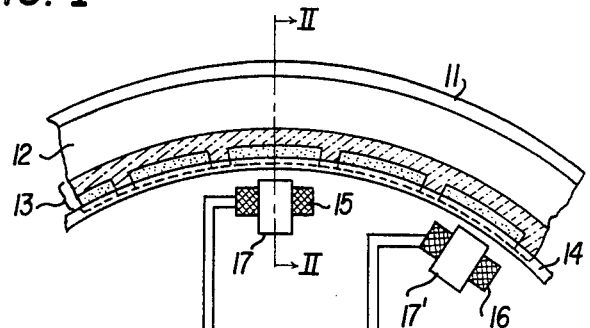
FIG. 1 is a schematic view of a preferred embodiment according to this invention.
Figure 2:
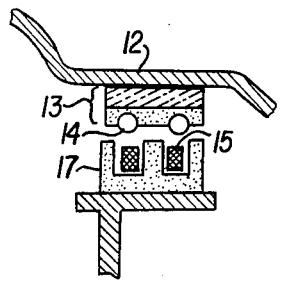
FIG. 2 is a section through line II—II in FIG. 1.

Referring to the drawings, a preferred embodiment according to this invention is explained. As shown in FIGS. 1 and 2, a coil 14 for rotation is mounted in the inner side of a frame rim 12 of a tire wheel 11 by means of a flexible ferrite band 13, which coil is rotatable with wheel 11. A pair of coils 15 and 16 are fixed adjacent to coil 14 for rotation and spaced a distance one from the other in the rotary direction of tire wheel 11. Coils 15 and 16 are fixed on the chassis of a car and wound with respective E-shaped ferrite cores 17 and 17' as shown in FIGS. 1 and 2. Coil 15 is for electromagnetic coupling and connected to an oscillator 18, while coil 16 is for detection and connected to a circuit 19 for treatment of detected signals. This circuit 19 is connected with its one terminal to an alarm generator 20 and with its other terminal to an indicator 21.

Figure 3:
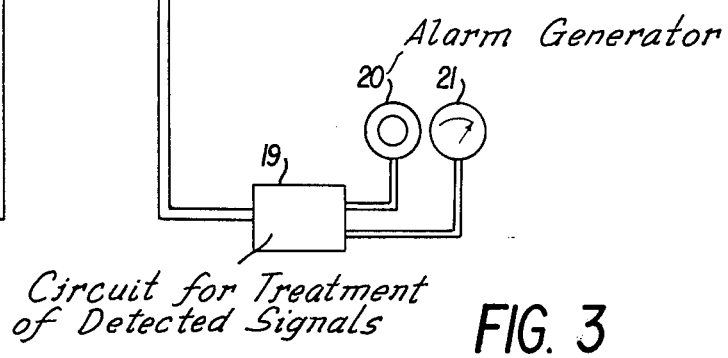
FIG. 3 is a sectional view showing a substantial part of a detection means according to this invention.
Figure 4:
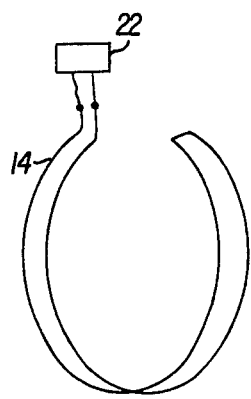
FIG. 4 is a perspective view of a coil for rotation according to this invention composed of a single conductor.
Figure 6:
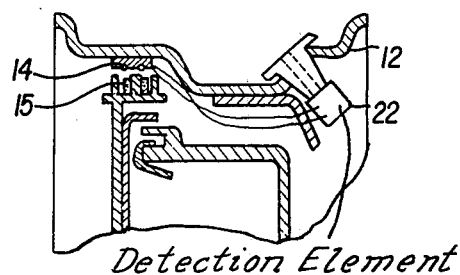
FIG. 6 is a view similar to the one in FIG. 4, but showing the coil of FIG. 4 composed of a bundle of connectors.
Figure 5:
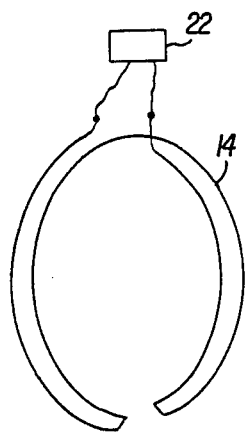
FIG. 5 is a similar view to FIG. 4, but showing another mode of a coil for rotation.
Figure 7:
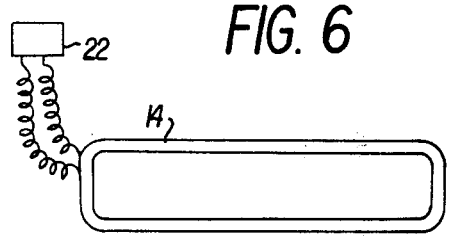
FIG. 7 is a view similar to the one in FIG. 5, but showing the coil of FIG. 5 composed of a bundle of connectors.
Figure 7:
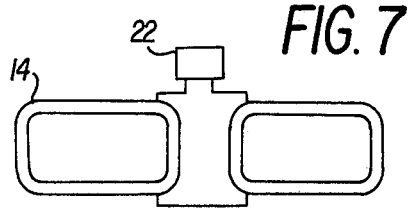

As shown in FIG. 3, coil 14 for rotation is connected with both its terminals to a detection element 22, which has the ability to pick up variations in resistance values in accordance with the condition of air pressure in the tire. Coil 14 is constituted having a single conductor parallel formed by being doubled back as shown in FIG. 4 or having a bundle of plural conductors parallel formed in the same manner as shown in FIG. 6, respectively in a circle. The two terminals of coil 14 are connected to the detection element 22. As shown in FIGS. 5 and 7, coil 14 may be constituted having a single conductor or a bundle of conductors parallel formed with its two returned portions opposed. Coil 14 may be mounted such that its parallel portion becomes parallel to the axis of the tire as shown and alternately is deviated from the direction normal to the axis. Further, coil 14 may be disposed not only on the inner side of the rim frame 12, but also on the outer side thereof. As well, coil 14 may be mounted near to the central direction of the tire.

As shown in FIG. 8, element 22, for use in detection of air pressure, communicates with the interior of the tire, where a bellows 23 is covered with an inner cap 24. Cap 24 is surrounded with a coil or film-like resistor 25. A slider 26 is disposed to be in contact with parts of the resistor 25. An outer case 27 encloses all these components, and a spring 28 is interposed between the top of cap 24 and the interior upper part of outer case 27.

In case detection in phase variations is to be carried out as is hereinafter described, a detection means as shown in FIG. 9 is used, including a cap 24 made from magnetic-material-like ferrite and a coil 29 mounted on the outer circumference of the outer case 27.

In the so defined detection means, bellows 23 of the detection element 22 is always biased and compressed by spring 28. The expansion of bellows 23 depends upon the air pressure in the tire.

In the case of the detection means shown in FIG. 8, bellows 23 is expanded against spring 28 at times of sufficient air pressure to indicate a high resistance value by means of the slider 26. When the air pressure is lowered, bellows 23 is compressed by spring 28 to indicate a low resistance value. In the case shown in FIG. 9, inductance varies in response to the expanding condition of bellows 23.

In operation, again referring to FIG. 1, oscillator 18 applies an oscillating signal to coil 15, which is thus excited. Thus an E.M.F. is induced in coil 14 which is adjacent coil 15. A signal responsive to the induced E.M.F. is detected in the detection coil 16, and introduced to the circuit 19 for pulse integration and other treatment. The output of circuit 19 is applied to drive the alarm generator 20 and the indicator 21. If air pressure in the tire is changed, the bellows 23 is expanded or compressed accordingly and the resistance value in the loop including coil 14 for rotation varies in response to the condition of air pressure in the tire, and in this manner the voltage detected in detection coil 16 corresponds therewith.

Variations of the thusly detected voltage can be used. For example, a value of the detected voltage in the condition prior to puncture of a tire can be predetermined, such that it is possible to design a circuit 19 operatively associated with the alarm generator 20 and alternately with the indicator 21 to indicate continuous analogue values of the detected voltage.

In another embodiment which does not employ the above defined resistance value variations, a switch is provided between the two terminals of the coil 14 for rotation. This switch is put on or off to close or open the coil 14 for rotation in response to the condition of air pressure in the tire, so that existence alone of any output in detection coil 16 may be connected operatively to the alarm generator 20 and indicator 21.

As shown in FIGS. 4–7, coil 14 for rotation according to this invention is short cut on its way to forming a parallel portion. In other words, this conductor is doubled back on itself. Thus, when coil 15 receives an oscillating signal from oscillator 18, and an E.M.F. is induced in coil 14, it has two opposed current directions through its parallel conductor portion, thereby preventing absorption of noise from the exterior. This effect is evident from use of parallel line feeders.

In general, electric noises generated from a car are various and considerable. When a horn is operated it generates a strong electric wave which becomes a great electric noise. In addition, other cars, motocycles and the like produce electric noises. It is known that ordinary coils are inclined to absorb such electric noises which results in a considerably low signal-to-noise ratio, so that correct information cannot be obtained. Coil 14 for rotation, as constructed in the foregoing, aims to remove such a draw-back and is designed to be affected by coil 15 alone, so that remarkable improvement of signal-to-noise ratio resulting in correct detection can be achieved.

As can be understood from FIGS. 1 and 2, coil 14 is backed with flexible ferrite such as plastic or rubber ferrite 13 which is molded with the rim 12 of the tire wheel 11. Since the coil 14 is covered on its back with ferrite 13, inductance on coil 14 becomes great and coil 14 is thus exclusively coupled to coil 15 electromagnetically to induce a high E.M.F. In the result, it is allowed to make use of small amplification at a subsequent stage and simplify the circuit construction.

Further, since the ferrite 13 is flexible and formed in a belt, ferrite 13 can be prefabricated to be incorporated with the coil 14 to facilitate mounting the system on the rim 12. In case coils 15 and 16 are fixed in a narrow gap, ferrite portions of the flexible band are preferably divided discontinuously to avoid their direct magnetic connection.

As an alternative to using a variable resistor element, a variable phase element can be used. As shown in FIG. 10, a switch 32 is connected to the two terminals of coil 14 via a coil 30 and a condenser 31. A condenser 33 is connected between a joint point of switch 32 to coil 30 and a terminal of coil 14. Switch 32 may be designed to be on or off when air pressure in the tire attains a value prior to the one indicative of a puncture danger.

Coil 30 and condensers 31 and 33 are respective tuning elements. For example, in case switch 32 is put off at a given inductance of coil 14, but closed in tune with a fixed frequency, the tuning point and phase are correspondingly changed by operation of this switch.

According to another mode, a variable inductance element 35 is connected via a condenser 34 between two terminals of the coil 14 as shown in FIG. 11. This variable inductance element 35 is constructed as shown in FIG. 9. According to this connection, analogue variations of phase can be viewed in accordance with the condition of air pressure in the tire. Further, as for coil 14 having two opposed and returned portions as referred to above, there is provided a selective switch 35 as shown in FIG. 12, whereby the winding direction can be reversed to change the phase.

While the principle of detecting the air pressure in a tire has been described above in connection with specific embodiments, it is to be clearly understood that this invention is not limited thereto or thereby and that the temperature of a tire which has an important connection with puncture and bursting can also be detected. This may be accomplished by use of a positive characteristic semiconductor.

I claim:

1. An information detector for a tire wheel comprising:

at least one coil mounted for rotation and being coiled about the circumference of the wheel, said coil being formed by parallel portions in a conductor which are doubled back so that said parallel portions are adjacent one another but are separated by a uniform space extending about the circumference of the wheel, said parallel portions on opposite sides of said space normally conducting in opposite directions;

a detection means connected to said coil for rotation and arranged to vary electric conductivity of said coil for rotation in accordance with a parameter of the wheel;

two fixed separate coils opposed in a gap to the parallel portions of said coil for rotation, the first of which is for electromagnetic coupling a signal to the coil for rotation and the second of which is for detecting the signal via electromagnetic coupling, with said coil for rotation, said fixed separate coils being positioned in close relation to said parallel portions and oriented such that their axes extend substantially through said uniform space;

an oscillator arranged to supply said signals connected to the first fixed coil; and an indicating means having a circuit connected to the second fixed coil for treatment of the signal detected by said second fixed coil.

2. An information detector as in claim 1 wherein said coil for rotation is formed of a bundle of doubled-back conductors.

3. An information detector as in claim 1 wherein said indicating means includes a warning means for responding to a predetermined magnitude only of said electric conductivity of said coil for rotation.

4. An information detector as in claim 1 wherein said detection means includes a variable resistor to vary said electric conductivity.

5. An information detector as in claim 4 wherein said parameter is tire pressure and said variable resistor is acted on by tire pressure to vary said resistance.

6. An information detector as in claim 1 wherein said detection means includes a variable reactance to vary said electric conductivity.

7. An information detector as in claim 6 wherein said variable reactance varies the phase of current flowing through said coil for rotation.

8. An information detector as in claim 1 wherein is further included a substantially E-shaped pole piece/core and wherein at least one of said two fixed coils is coiled about the center extension of said substantially E-shaped pole piece/core, the center extension of said pole piece/core being directed toward said space and the outside extensions thereof being directed outside opposite adjacent parallel portions.

9. An information detector as in claim 8 wherein both of said coils are mounted on substantially identical E-shaped pole piece/cores in substantially identical manners.

10. An information detector as in claim 9 wherein is further included a flexible ferrite backing on which said parallel portions are mounted.

11. An information detector as in claim 1 wherein is further included a flexible ferrite backing on which said parallel portions are mounted.

12. An information detector as in claim 11 wherein said flexible ferrite is integral with said tire wheel.

* * * * *